United States Patent
Chan et al.

(10) Patent No.: US 9,037,670 B2
(45) Date of Patent: May 19, 2015

(54) ULTRA LOW LATENCY NETWORK BUFFER STORAGE

(71) Applicant: Cisco Technology, Inc., San Jose, CA (US)

(72) Inventors: Kelvin Chan, San Jose, CA (US); Ganga S. Devadas, Milpitas, CA (US); Chih-Tsung Huang, Burlingame, CA (US); Wei-Jen Huang, Burlingame, CA (US); Dennis K. D. Nguyen, San Jose, CA (US); Yue J. Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 13/708,380

(22) Filed: Dec. 7, 2012

(65) Prior Publication Data

US 2014/0082118 A1 Mar. 20, 2014

Related U.S. Application Data

(60) Provisional application No. 61/702,326, filed on Sep. 18, 2012.

(51) Int. Cl.
*G06F 15/167* (2006.01)
*H04L 12/861* (2013.01)

(52) U.S. Cl.
CPC .......... *G06F 15/167* (2013.01); *H04L 49/9042* (2013.01); *H04L 49/9057* (2013.01); *H04L 49/9094* (2013.01)

(58) Field of Classification Search
USPC ........... 709/224, 212; 370/389, 390, 401, 252
See application file for complete search history.

(56) References Cited

U.S. PATENT DOCUMENTS

| | | | |
|---|---|---|---|
| 6,892,237 B1 * | 5/2005 | Gai et al. | 709/224 |
| 7,106,731 B1 * | 9/2006 | Lin et al. | 370/389 |
| 7,317,730 B1 | 1/2008 | Devanagondi et al. | |
| 7,395,332 B2 * | 7/2008 | Gai et al. | 709/224 |
| 7,474,666 B2 * | 1/2009 | Kloth et al. | 370/401 |
| 7,656,818 B1 | 2/2010 | Baroudi et al. | |
| 7,830,793 B2 * | 11/2010 | Gai et al. | 370/230 |
| 7,899,048 B1 * | 3/2011 | Walker et al. | 370/390 |
| 7,961,621 B2 | 6/2011 | Bergamasco et al. | |
| 7,969,971 B2 | 6/2011 | Gai et al. | |
| 8,208,389 B2 * | 6/2012 | Alaria et al. | 370/252 |
| 8,640,036 B2 | 1/2014 | Pignataro et al. | |
| 2003/0108056 A1 | 6/2003 | Sindhu et al. | |
| 2004/0213251 A1 | 10/2004 | Tran et al. | |

FOREIGN PATENT DOCUMENTS

EP 1137225 A1 9/2001

OTHER PUBLICATIONS

International Search Report and Written Opinion in counterpart International Application No. PCT/US2013/059347, mailed Feb. 20, 2014, 9 pages.

* cited by examiner

*Primary Examiner* — Tammy Nguyen
(74) *Attorney, Agent, or Firm* — Edell, Shapiro & Finnan, LLC (57) ABSTRACT

Buffer designs and write/read configurations for a buffer in a network device are provided. According to one aspect, a first portion of the packet is written into a first cell of a plurality of cells of a buffer in the network device. Each of the cells has a size that is less than a minimum size of packets received by the network device. The first portion of the packet can be read from the first cell while concurrently writing a second portion of the packet to a second cell.

23 Claims, 5 Drawing Sheets

ULTRA LOW LATENCY NETWORK BUFFER STORAGE

CROSS REFERENCE TO RELATED APPLICATION

This application claims priority to U.S. Provisional Application No. 61/702,326, filed Sep. 18, 2012, and entitled "Ultra Low Latency Network Buffer Storage," the entirety of which is incorporated herein by reference.

TECHNICAL FIELD

The present disclosure relates generally to minimizing buffer storage in a network device.

BACKGROUND

An ultra-low latency network is a particular type of computing network used, for example, by High Frequency Trading (HFT) customers to trade financial assets. In such applications, even slight delays in transmission time may have financial repercussions. In particular, having a faster data connection than a competitor may enable an HFT customer to increase order flow, liquidity, accelerate price discovery and capture opportunities during periods of volatility to gain a competitive advantage.

Conventional networking devices used in computing networks, even ultra-low latency networks, will incur undesirable latency by temporarily storing received data packets in network buffers to absorb arbitration, forwarding, or congestion delays. For example, a crossbar and port logic architecture may store a packet up to four times (e.g., input port, input crossbar, output crossbar, and output port). Additionally, shared memory architecture may result in storing data up to three times (e.g., at input port, buffer memory, and output port). Each of these storage operations adds undesired latency.

DESCRIPTION OF EXAMPLE EMBODIMENTS

Overview

Buffer designs and write/read configurations for a buffer in a network device are presented herein. A packet is received at a port of the network device. According to one aspect, a first portion of the packet is written into a first cell of a plurality of cells of a buffer in the network device. Each of the cells has a size that is less than a minimum size of packets received by the network device. The first portion of the packet can be read from the first cell while concurrently writing a second portion of the packet to a second cell.

Example Embodiments

Network devices such as switches measure latency as the transmit time (departure) of a first bit of a packet minus the receive time (arrival) of the first bit of the packet. One cause of this latency is the buffering of arriving packets (i.e., temporary storage of received packets to absorb arbitration, forwarding, or congestion delays). It is desirable for buffers in a network device to have the capability of writing and reading a total of 2*(M input ports*N Gbps) in order to sustain wire rate. High port density count and high port performance speed have imposed significant architectural challenges.

Buffer writes should be performed in a manner that prevents packet loss. High bandwidth operations, such as efficient writes into network buffers, have input buffer stages that build up page units prior to data storage. Pre-staging of this via input port buffers results in page latencies. For example, a 100 byte page at 10 Gigabits per second (Gbps) may add an additional 160 nanoseconds (ns) in latency (80 ns for write and 80 ns for read).

Techniques to reduce or eliminate input buffer stages (i.e., input accumulation) and thereby reduce latency are presented herein. These techniques operate by reducing (separating) the buffer memory page storage unit into cells. For example, a 200 byte page can be divided into twenty 10 byte cells. Each 10 byte cell is an individual memory bank column that can be written to in a way that provides full access to one or more of the cell columns to store the packet without delay. Independent column access helps ensure that there will be no data dropped as a result of high bandwidth writes at wire speed (which is conventionally achieved through input buffering). Additional optimization can be achieved, for example, by further reducing the size of the cells, by dividing the cells into sub-cells, etc.

The techniques presented herein use a shared memory architecture, multiple memory cells, and work conserving arbiters to reduce the amount of storage and arbitration latency, which are key components of buffer latency. Reduction of latency is of utmost importance to ultra low latency network users. The techniques presented herein may achieve minimum to zero latency storage under specific cases, achieve latencies independent of packet size, achieve same wire rate low latency for unicast, Layer 2 multicast and Layer 3 multicast, and/or achieve capabilities that sustain very high density and high performance ports.

Figure 1:
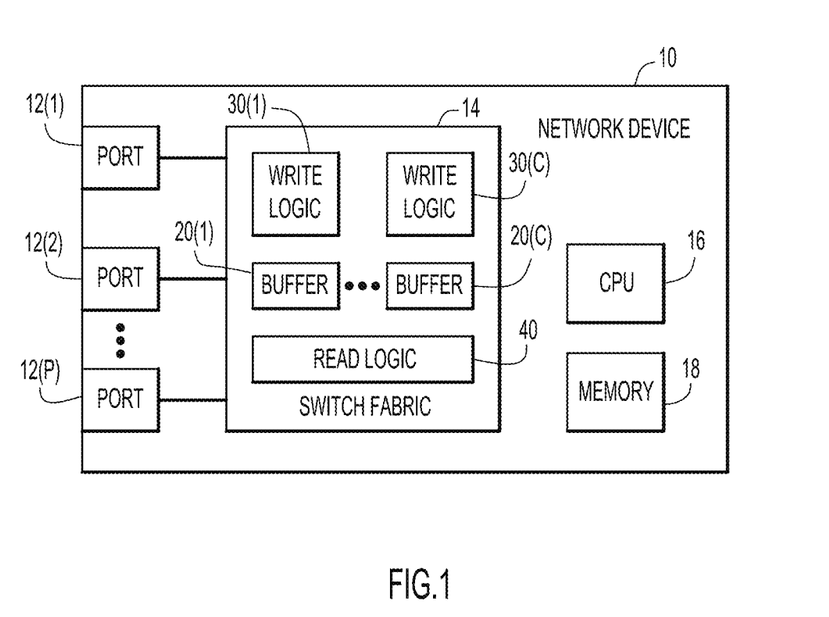
FIG. 1 illustrates a block diagram of a network device that is configured to perform reading and writing of packets into memory according to the techniques presented herein.

Referring now to FIG. 1, a high level block diagram is provided of a network device 10 configured for ultra low latency buffer storage. The network device 10 includes a plurality of ports 12(1)-12(P) at which packets may arrive to the network device 10 and depart from the network device. The ports 12(1)-12(P) are coupled to a switch fabric 14. The switch fabric 14 includes digital logic and associated memory to perform processing decisions on packets. The switch fabric 14 may be implemented in one or more application specific integrated circuits (ASICs). The network device 10 also includes a central processing unit (CPU) 14 and memory 18. Other components may exist in the network device 10 but are not shown in FIG. 1 because they do not pertain to the low latency buffer storage techniques presented herein. FIG. 1 shows that the switch fabric 14 includes a bank of buffers 20(1)-20(C), a bank of corresponding write logic 30(1)-30(C) and a read logic 40. Thus, there is a write logic block 30(1) for buffer 20(1), and so on.

Memory 18 may comprise read only memory (ROM), random access memory (RAM), magnetic disk storage media devices, optical storage media devices, flash memory devices, electrical, optical, or other physical/tangible memory storage devices. Thus, in general, the memory 18 may comprise one or more tangible (non-transitory) computer readable storage media (e.g., a memory device) encoded with software comprising computer executable instructions and when the software is executed (by the CPU 16) it is operable to perform operations described herein.

The network device 10 can be any network device now known or hereinafter developed, including a switch, router, gateway, a software stack on a host device, virtual network interface cards (VNICs) virtual switches, physical network interface cards (including those that support virtualization).

Figure 2:
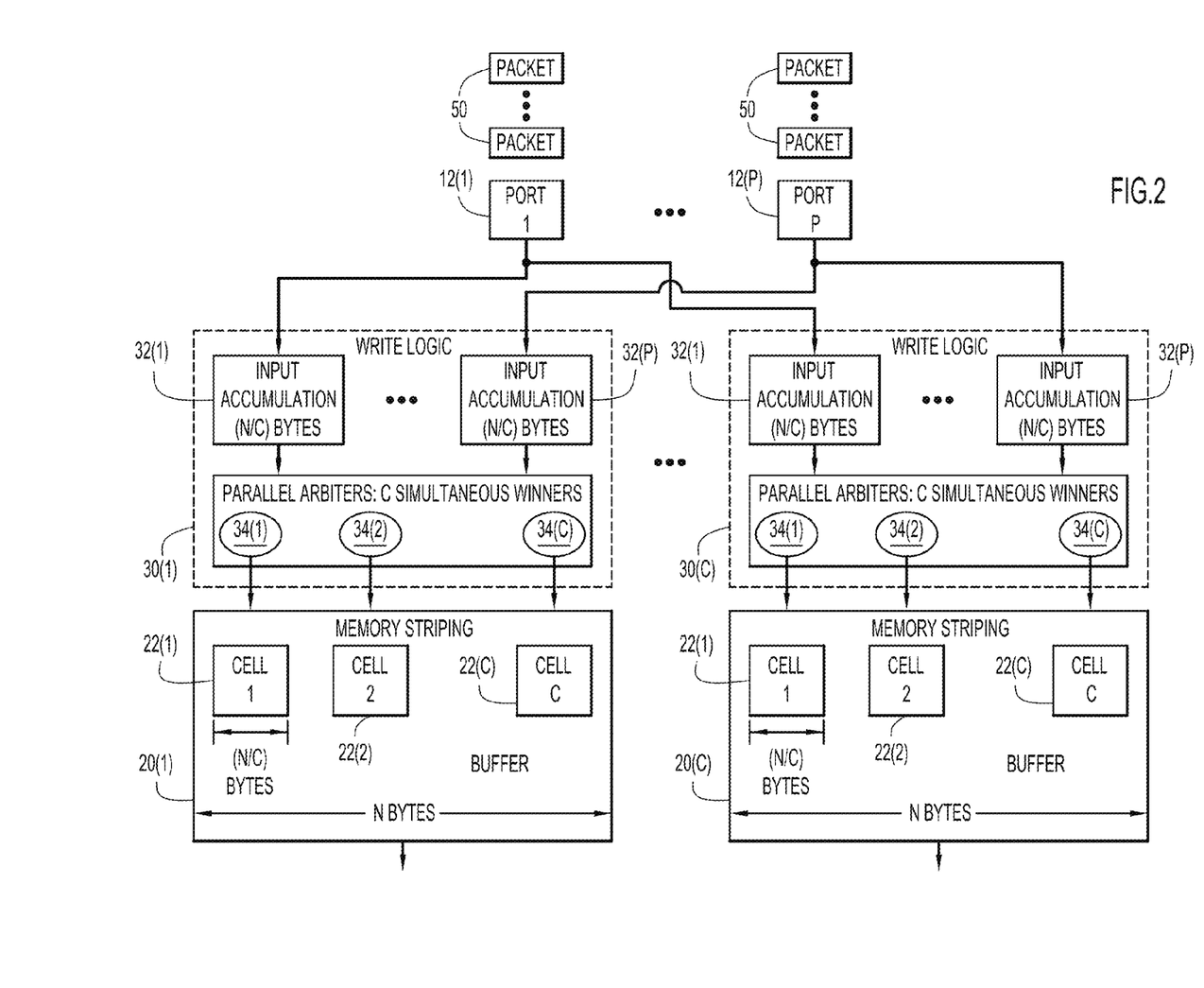
FIG. 2 is a detailed block diagram of a plurality of buffers and the associated write logic for each buffer.

Reference is now made to FIG. 2, for a more detailed description of the buffers 20(1)-20(C) and the associated write logic 30(1)-30(C). Each buffer 20(1)-20(C) comprises a plurality of cells 22(1)-22(C). Each cell 22(1)-22(C) is an individual memory bank column that can be written to independently, as generally explained above. There are C cells in one line of memory of the buffer for a total of N bytes in one line of memory. Moreover, each of the cells has a size that is less than a minimum size of packets expected to be received by the network device.

The ports 12(1)-12(P) are connected to each write logic 30(1)-30(C). More specifically, each write logic block includes an input accumulator 32(1)-32(P), and each input accumulator 32(1)-32(P) is connected to a corresponding one of the ports 12(1)-12(P). Each input accumulator 32(1)-32(P) accumulates N/C bytes before packet content can be written to any one of the plurality of cells in the associated buffer. In addition, each write logic block includes C plurality of parallel write arbiters 34(1)-34(C). Data for a packet received at one of the ports 12(1)-12(P) is connected to one of write arbiters 34(1)-34(C), after it has sufficiently accumulated in one of the input accumulators 32(1)-32(P). Packet data from a given port is written one cell at a time into the buffer, and then across the cells in the buffer until the entire packet has been written. At any given time, C write arbiters can write to the C cells. Therefore, when packet data arrives in one of the input accumulators 32(1)-32(P) from one of the ports 12(1)-12(P), the input accumulator waits to accumulate N/C bytes and waits a maximum of P/C cycles to gain access to the buffer memory.

The size of each of the cells 22(1)-22(C) of a buffer may be made such that latency associated with writing of a packet to the buffer and reading a packet from the buffer is independent of the size of the packet. Similarly, the size of each of the cells 22(1)-22(C) of a buffer may be made such that latency associated with writing of a packet to the buffer and reading a packet from the buffer is independent of port speed (e.g., 10 Mbps or 100 Gbps).

The write arbiters 34(1)-34(C) operate independently and in parallel such that packets may be received at the plurality of ports 12(1)-12(P) and portions from those packets may be simultaneously written to different cells within an associated buffer, e.g., buffer 20(1). The write arbitration scheme is one in which P cells of the buffer are write conflict-free for data of packets arriving at the P plurality of ports 12(1)-12(P). For example, with a 20 port system where all the packets arrive at the same time, a first portion of all 20 packets are written in at the same instant (i.e. time). An extension to write conflict-free is the capability to write-replicate low latency multi-destination packets. For example, if a multi-destination (multicast) packet M arrives from port 12(1) and is destined for ports 12(2) to 12(20), and no incoming data arrives at ports 12(2) to 12(20), packet M is transmitted out of ports 12(2) to 12(20) simultaneously by parallel writes to each output queue.

Figure 3:
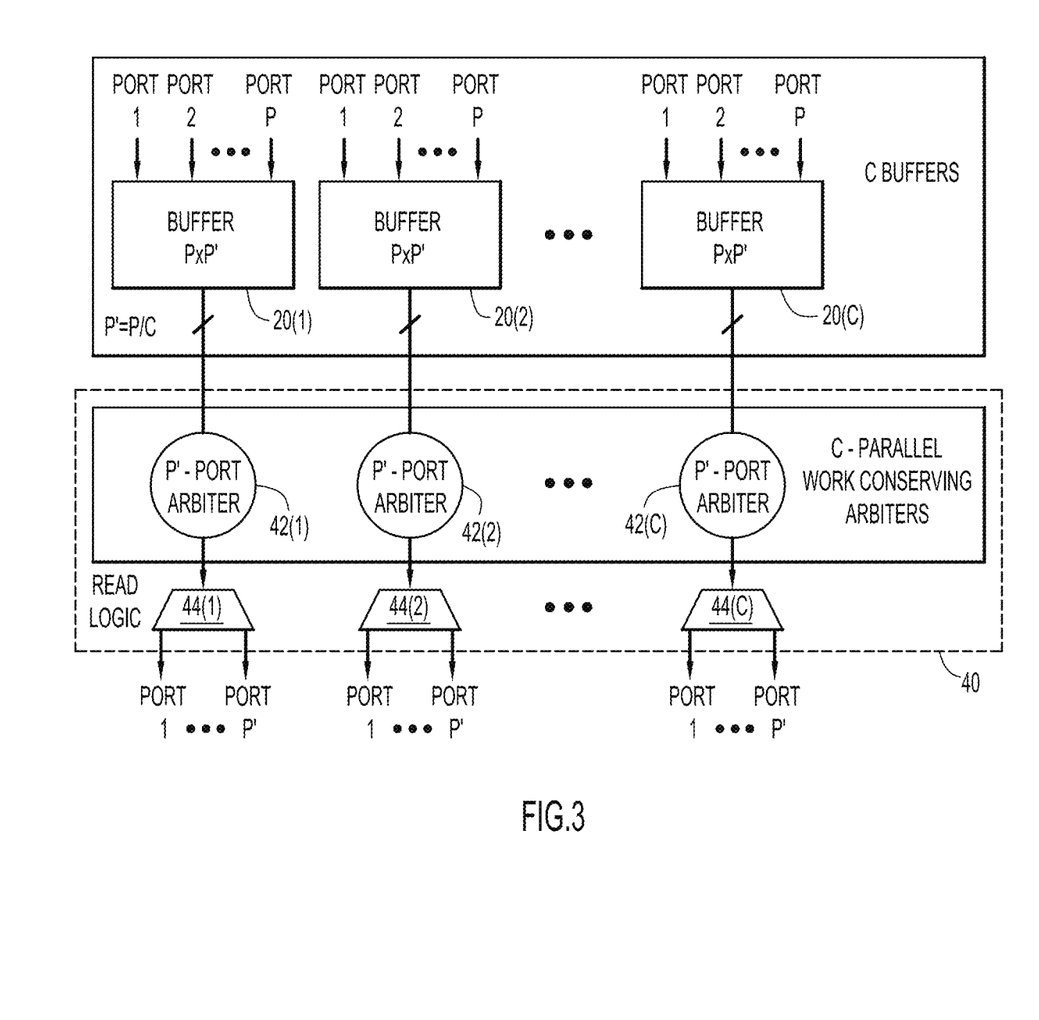
FIG. 3 is a detailed block diagram of the plurality of buffers and the associated read logic for the plurality of buffers.

Reference is now made to FIG. 3. FIG. 3 shows more details of the read logic 40 associated with a plurality of buffers 20(1)-20(C), where the buffers 20(1)-20(C) are the same buffers as shown in FIG. 2. The read logic 40 comprises C plurality of read arbiters 42(1)-42(C), each coupled to an output of a corresponding one of the buffers 20(1)-20(C), and a plurality of demultiplexers 44(1)-44(C), each being coupled to output of a corresponding read arbiter 42(1)-42(C). Each buffer 20(1)-20(C) has P input ports (also as shown in FIG. 2) but only P'=P/C number of outputs. This allows the read arbiters 42(1)-42(C) to arbitrate among a fewer number of outputs of the buffers for a first portion (cell) of a packet, enabling work conserving round robin arbitration schemes. In the worst case, an output port has to wait P/C cycles to receive the first portion (cell) of a packet. The configuration shown in FIG. 3 provides for the ability to read conflict-free from each of cell from all the stored data of P ports in order to achieve low latency. In general, the larger the value of C, the less write or read conflict that can occur in the configurations of FIGS. 2 and 3.

It should be appreciated that the write logic and read logic shown in FIGS. 2 and 3 may be implemented in hardware by digital logic gates, and integrated into the ASIC that contains all of the other hardware components of the switch fabric.

Figure 4:
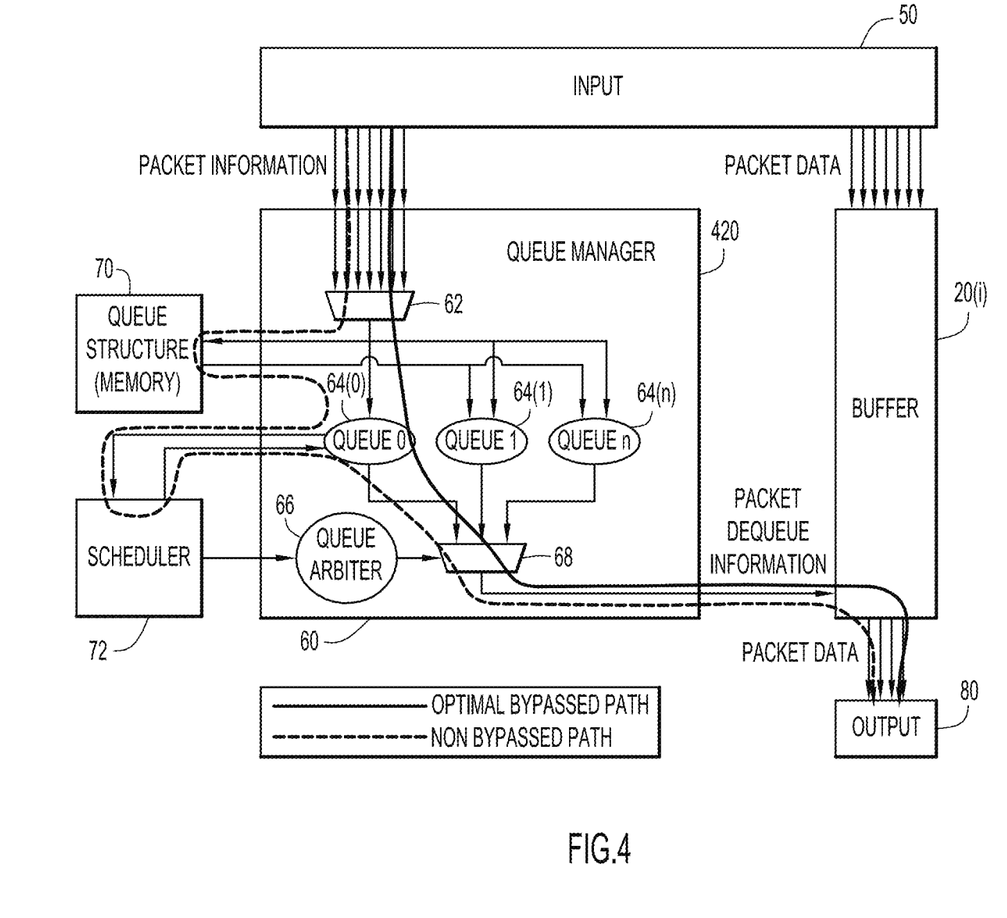
FIG. 4 is a block diagram illustrating a queue structure, scheduler and queue manager, where the queue manager is configured to bypass the queue structure and/or scheduler under certain circumstances.

Turning now to FIG. 4, an output arrangement is shown in which a buffer, shown generically as buffer 20($i$), is coupled to an input 50 (consisting of one or more ports). A queue manager 60 is also connected to the input 50. The queue manager 60 is digital logic configured to manage a queue structure 70. The queue manager comprises a multiplexer 62, a plurality of output queues 64(0)-64($n$), a queue arbiter 66 and a multiplexer 68. FIG. 4 also shows a scheduler block 72. The scheduler 72 is coupled to the queue arbiter 66 and the output queues 64(0)-64($n$) to control the order in which packets are processed by the output queues 64(0)-64($n$). The queue manager 60, queue structure 70 and schedule 72 may be implemented by digital logic gates.

The queue manager 60 can bypass either or both the queue structure 70 and the scheduler 72 if the output queues 64(0)-64($n$) are empty. The dashed line in FIG. 4 represents a non-bypassed path traversed when the output queues are not empty. The packet information (containing the packet pointers) is first stored in the queue structure 70. The scheduler 72 detects a non-empty queue and instructs the queue manager 60 to read the packet information and pass it on to the buffer 20($i$) so that the packet can be read out to the output 80 (one of the ports 12(1)-12(P)). However, if the output queues are empty at the time the packet information arrives, the services of the queue structure 70 and scheduler 72 are not needed. The scheduler 72 can also be bypassed if only one of the output queues 64(0)-64($n$) is active. The solid line in FIG. 4 represents the path taken if both the queue structure 70 and scheduler 72 are bypassed. In this case, the packet information is directed straight to the buffer 20($i$) so that the packet can be read out immediately.

Thus, in summary, the arrangement shown in FIG. 4 allows for bypassing a queue structure that is associated with a plurality of output queues associated with a buffer. The queue manager makes a determination as to whether the plurality of output queues are empty when routing context information is received for a packet to be read out. If the plurality of output queues are empty, then the queue manager may bypass the queuing structure 70 and the routing context information is supplied to one of the plurality of output queues.

Furthermore, in summary, the arrangement shown in FIG. 4 allows for bypassing a scheduler. The queue manager determines whether only one of the output queues is active. When only one of the output queues is determined to be active, then the scheduler may be bypassed and the packet is forwarded directly to the buffer so that it can be read out immediately. The queue structure bypass and scheduler bypass may be performed separately and independently from each other.

An additional low latency aspect involves "drop bypass". A "drop bypass" can be performed if a packet has been stored in buffer that is later determined to be dropped (i.e. not transmitted) due to timeout expiration (duration in buffer too long) or policed (intentionally dropped). Rather than reading out the entire packet in order to drop the packet, the context information for the packet in the output queues is deleted, thereby bypassing dequeue of the drop packet.

Figure 5:
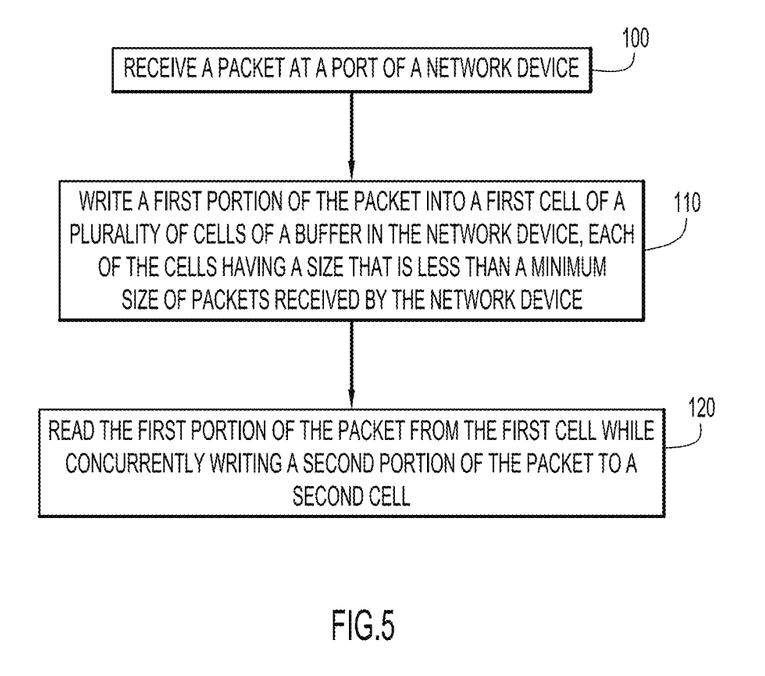
FIG. 5 is a flow chart that generally depicts read and write operations for the buffer configurations presented herein.

Reference is now made to FIG. 5. FIG. 5 illustrates a flow chart depicting operations performed in a network device according to the configurations described above in connection with FIGS. 2-4. At 100, a packet is received at a port of a network device. At 110, a first portion of the packet is written into a first cell of a plurality of cells of a buffer in the network device. Each of the cells has a size that is less than a minimum size of packets received by the network device. Packets may be received at multiple ports, e.g., P ports of the network device, and portions of the packets may be simultaneously written to different cells of the buffer. The write operation may use an arbitration scheme in which P cells of the buffer are write conflict-free for data of packets arriving at the P plurality of ports. At 120, the first portion of the packet can be read from the first cell while concurrently writing a second portion of the packet to a second cell. In general, when there are C buffers, each having P inputs corresponding to P plurality of ports and an output, arbitration may be made among a fewer number of the outputs of the buffers for a first portion of a packet when reading from the C buffers.

Example and Latency Analysis

The following is an example and associated latency analysis for the buffer system design presented above. The following definitions are made:

P=number of ports on switch,
P'=number of ports in one shared buffer,
N=width of shared memory (Bytes),
F=frequency, and
X=Port Speed (Gbps).

In a conventional buffer design, when a packet from a given input port is ready to be written into a shared buffer, it will be arbitrated with packets from all other input ports for access to the shared buffer. This means that the more input ports that are present, the longer a packet may have to wait before it will be written into the shared buffer. Typically this scales linearly with P if a Time Division Multiplexing (TDM) scheduling arbiter is used. Therefore the typical write arbitration latency is:

Write arbitration latency=$P$ [cycles]/$F$ [cycles per second]

Before reading the packet from the shared buffer, an entire line of memory has to have been written into memory, or in other words, N bytes. This implies that either N bytes or the entire packet must have arrived into the shared buffer, whichever is lesser of the two. This latency is defined as:

Data accumulation latency=$N$ [Bytes]*8/$X$ [Gbps]*10$e$9

Finally, when an output port tries to read from the shared buffer, it too is arbitrated with all other output ports for access to the shared buffer. Similar to the write arbitration, using a TDM scheduling arbiter, the latency here is defined as:

Read arbitration latency=$P'$ [cycles]/$F$ [cycles per second]

The total latency is:

Total latency=$(P+P')/F+N*8/X*10e9$

The techniques presented herein reduce the latency through the shared buffer by splitting the entries in the shared buffer (denoted as pages) into smaller chunks, i.e., the cells. This combined with an improved write and read arbitration scheme enables the reading of cells of a page before the entire page has even been written into the shared buffer.

In the techniques presented herein, the width of the shared buffer (N) is chosen based on the required bandwidth and packet rate. For example:

$N=(1/F)*10$ Gbps$*P*(\frac{1}{8})*10e9$

The width will generally be a minimum of 148 bytes in order to ensure that the worst case page rate (the rates at which entries are written into the shared buffer) is less than the worst case packet rate.

The page rate requirement may be:

Page rate for a (2$N$>=packet size>$N$)=[Packet_rate in Mega Packets Per Seconds (Mpps)*2]<[Worst case packet rate=14.88 Mpps]

For a 148 byte packet, the packet rate is 7.44 Mpps, thereby satisfying the above requirement.

As explained above in connection with FIGS. 2-4, there are C cells in each buffer. Thus, N is split into C equal pieces or cells which are each individual banks of memories in the shared buffer. This allows more ports to write to the shared memory at one time (i.e., C ports). Furthermore, only N/C bytes of memory are accumulated before the start of writing into the shared buffer.

With the buffer design presented herein, the start of a packet may be written into any bank of memory (starting cell of the packet). The starting cell is passed to the read controller that will order the packet appropriately.

The write arbitration latency can be reduced to:

Write arbitration latency=$P$[cycles]/$F$ [cycles per second]/$C$

Given that only N/C bytes need to be accumulated before writing into the shared buffer, the data accumulation latency also reduces by C. As such:

Data accumulation latency=$N$ [Bytes]*8/$X$ [Gbps]*10$e$9/$C$

With this design, the packet can be read after a cell has been written into memory. This process relies on an assumption that the write rate is similar to the read rate, and on an assumption that when the packet is read out, the first cell is the start of packet cell.

The read arbitration latency is improved by a factor of C, but if the first cell is not the start of packet cell (as assumed above) then this design will incur additional latency from having to read the entire page and reordering the cells before sending out the packet.

In operation, each output port (port from which a packet is to depart from the network device) is able to read the starting cell of a packet first. This means the shared buffer ensures a bank conflict read on the output (i.e., all output ports try to read the first bank of memory). As a result:

$P'=P/C$

It is to be noted that increasing C will reduce latency further at the expense of having to increase the number of shared buffers, where:

Number of Shared buffers=$P/P'$;

Depending on the number of ports, the tradeoff between C and the number of shared buffers can be decided. However, the larger the value of C, the less write conflict or read conflict arises.

Finally, the read arbitration for the design presented herein is:

Read arbitration latency=$P'$ [cycles]/$F$ [cycles per second]

Furthermore, because $P'=P/C$, a work conserving arbitration scheme can be used. This means the above read arbitration becomes a non-typical maximum latency, and the statistical average latency on the read arbitration is much lower. In this design, the total latency is reduced by a factor of C.

The above description is intended by way of example only.

What is claimed is:

1. A method comprising:
receiving a packet at a port of a network device;
writing a first portion of the packet into a first cell of a plurality of cells of a buffer in the network device, each of the cells having a size that is less than a minimum size of packets received by the network device; and
reading the first portion of the packet from the first cell while concurrently writing a second portion of the packet to a second cell.

2. The method of claim 1, wherein the size of each of the plurality of cells is such that latency associated with writing of a packet to the buffer and reading a packet from the buffer is independent of the size of the packet.

3. The method of claim 1, wherein the size of each of the plurality of cells is such that latency associated with writing of a packet to the buffer and reading a packet from the buffer is independent of port speed.

4. The method of claim 1, wherein receiving comprises receiving packets at P plurality of ports of the network device, and writing comprises simultaneously writing portions of packets received at the P plurality of ports to different cells of the buffer.

5. The method of claim 4, wherein writing comprises writing with an arbitration scheme in which P cells of the buffer are write conflict-free for data of packets arriving at the P plurality of ports.

6. The method of claim 4, wherein there are C cells in one line of memory of the buffer for a total of N bytes in one line of memory, and further comprising accumulating N/C bytes before writing to any one of the plurality of cells.

7. The method of claim 6, further comprising providing C buffers, each buffer having P inputs corresponding to the P plurality of ports and an output, and arbitrating among a fewer number of the outputs of the C buffers for a first portion of a packet when reading from the C buffers.

8. The method of claim 1, further comprising:
providing a plurality of output queues associated with the buffer;
determining whether the plurality of output queues are empty when routing context information is received for a packet to be read out;
if the plurality of output queues are empty, then bypassing a queuing structure and supplying the routing context information to one of the plurality of output queues.

9. The method of claim 5, further comprising:
determining whether only one of the output queues is active; and
when only one of the output queues is determined to be active, then bypassing a scheduler and forwarding the packet directly to the buffer so that it can be read out immediately.

10. The method of claim 1, further comprising:
providing a plurality of output queues associated with the buffer;
determining whether only one of the output queues is active; and
when only one of the output queues is determined to be active, then bypassing a scheduler and forwarding the packet directly to the buffer so that it can be read out immediately.

11. A network device comprising:
a buffer configured to buffer packets that are received at a port of the network device, the buffer comprises a plurality of cells each having a size that is less than a minimum size of packets received by the network device; and
a plurality of write arbiters configured to enable writing of portions of packets into respective cells of the buffer, such that a first portion of a packet written into a first cell can be read from the first cell while concurrently writing a second portion of the packet to a second cell.

12. The network device of claim 11, wherein the size of each of the cells is such that latency associated with writing a packet to the buffer and reading a packet from the buffer is independent of the size of the packet.

13. The network device of claim 11, wherein there are C cells in one line of memory of the buffer for a total of N bytes in one line of memory, and further comprising a plurality of input accumulators associated with the buffer, each input accumulator for a corresponding one of P plurality of ports of the network device, and each input accumulator configured to accumulate N/C bytes of a packet before writing to any one of the plurality of cells.

14. The network device of claim 13, and further comprising C plurality of write arbiters configured to write to the buffer with an arbitration scheme in which P cells of the buffer are write conflict-free for data of packets arriving at the P plurality of ports.

15. The network device of claim 11, further comprising C plurality of buffers, each buffer having P inputs corresponding to the P plurality of ports and an output, and C plurality of read arbiters configured to arbitrate among a fewer number of the outputs of the C buffers for a first portion of a packet when reading from the C plurality of buffers.

16. The network device of claim 11, further comprising:
a queue manager comprising a plurality of output queues associated with the buffer;
a queue structure coupled to the queue manager; and
wherein the queue manager is configured to determine whether the plurality of output queues are empty when routing context information is received for a packet to be read out, and if the plurality of output queues are empty, the queue manager bypasses the queue structure and supplies the routing context information to one of the plurality of output queues.

17. The network device of claim 16, and further comprising a scheduler coupled to the queue manager, wherein the queue manager is configured to determine whether only one of the output queues is active, and when only one of the output queues is determined to be active, the queue manager is configured to bypass the scheduler and to forward the packet directly to the buffer so that it can be read out immediately.

18. The network device of claim 11, further comprising:
a queue manager comprising a plurality of output queues associated with the buffer;
a scheduler coupled to the queue manager;
wherein the queue manager is configured to determine whether only one of the output queues is active, and when only one of the output queues is determined to be active, the queue manager is configured to bypass the scheduler and to forward the packet directly to the buffer so that it can be read out immediately.

19. A network device comprising:
P plurality of ports at which packets may arrive at the network device and may depart from the network device;
a plurality of buffers comprising C plurality of cells, each of the cells having a size that is less than a minimum size of packets received by the network device;
a plurality of write logic each associated with a corresponding one of the plurality of buffers, wherein each write logic is configured to simultaneously write portions of packets received at the P plurality of ports to different cells of the associated buffer; and
read logic associated with the plurality of buffers, wherein the read logic is configured to arbitrate among a few number of outputs of the buffers for a first portion of a packet when reading from the plurality of buffers.

20. The network device of claim 19, wherein the size of each of the plurality of cells is such that latency associated with writing of a packet to the buffer and reading a packet from the buffer is independent of the size of the packet.

21. The network device of claim 19, wherein each write logic comprises P plurality of input accumulators, each associated with a corresponding one of the P plurality of ports, and configured to accumulate N/C bytes before writing to any one of the plurality of cells in an associated buffer.

22. The network device of claim 19, further comprising:
a queue manager comprising a plurality of output queues associated with one of the buffers;
a queue structure coupled to the queue manager; and
wherein the queue manager is configured to determine whether the plurality of output queues are empty when routing context information is received for a packet to be read out, and if the plurality of output queues are empty, the queue manager is configured to bypass the queue structure and supply the routing context information to one of the plurality of output queues.

23. The network device of claim 19, further comprising:
a queue manager comprising a plurality of output queues associated with one of the plurality of buffers;
a scheduler coupled to the queue manager;
wherein the queue manager is configured to determine whether only one of the output queues is active, and when only one of the output queues is determined to be active, the queue manager is configured to bypass the scheduler and to forward the packet directly to the buffer so that it can be read out immediately.

\* \* \* \* \*

UNITED STATES PATENT AND TRADEMARK OFFICE
CERTIFICATE OF CORRECTION

| | | |
|---|---|---|
| PATENT NO. | : 9,037,670 B2 | Page 1 of 1 |
| APPLICATION NO. | : 13/708380 | |
| DATED | : May 19, 2015 | |
| INVENTOR(S) | : Kelvin Chan et al. | |

It is certified that error appears in the above-identified patent and that said Letters Patent is hereby corrected as shown below:

In the claims

Column 8, Line 1, Claim 9, change "claim 5" to --claim 8--
Column 8, Line 47, Claim 15, change "to the P" to --to a P--

Signed and Sealed this
Tenth Day of November, 2015

Michelle K. Lee
*Director of the United States Patent and Trademark Office*